United States Patent [19]

Schiavoni

[11] Patent Number: 5,717,686
[45] Date of Patent: Feb. 10, 1998

[54] CELLULAR SPACECRAFT TDMA COMMUNICATIONS SYSTEM WITH CALL INTERRUPT CODING SYSTEM FOR MAXIMIZING TRAFFIC THROUGHPUT

[75] Inventor: Maryanne Theresa Schiavoni, Elsmere, Del.

[73] Assignee: Lockheed Martin Corporation, King of Prussia, Pa.

[21] Appl. No.: 786,599

[22] Filed: Jan. 21, 1997

[51] Int. Cl.$^6$ .................................................. H04J 3/12
[52] U.S. Cl. .................... 370/321; 370/324; 370/347; 370/458; 370/528; 371/30; 371/43; 371/47.1; 455/12.1
[58] Field of Search ....................... 370/528, 527, 370/522, 523, 310, 315, 316, 321, 324, 319, 322, 326, 345, 347, 431, 436, 442, 433, 458, 350, 252, 465, 503, 509, 473, 472, 470, 476, 478, 241, 242, 243; 371/47.1, 48, 30, 37.1, 37.2, 37.4, 37.7, 43, 44, 45, 46; 455/11.1, 12.1, 13.1, 13.2, 13.3

[56] References Cited

U.S. PATENT DOCUMENTS

| | | | |
|---|---|---|---|
| 3,634,628 | 1/1972 | Sekimoto | 370/321 |
| 4,115,661 | 9/1978 | Schmidt | 370/321 |
| 4,320,504 | 3/1982 | Alvarez, III et al. | 370/324 |
| 4,330,858 | 5/1982 | Choquet | 370/528 |
| 4,346,470 | 8/1982 | Alvarez, III et al. | 370/324 |
| 4,625,308 | 11/1986 | Kim et al. | 370/321 |
| 4,697,264 | 9/1987 | Galeusky et al. | 370/528 |
| 5,418,783 | 5/1995 | Yamaki et al. | 370/528 |
| 5,507,006 | 4/1996 | Knight | 370/528 |
| 5,535,432 | 7/1996 | Dent | 455/33.1 |
| 5,566,168 | 10/1996 | Dent | 370/323 |

Primary Examiner—Wellington Chin
Assistant Examiner—Huy D. Vu
Attorney, Agent, or Firm—W. H. Meise; G. H. Krauss; S. A. Young

[57] ABSTRACT

Improved throughput is provided in a spacecraft TDMA cellular communications system by in-call signalling without the need for flag bits, while still allowing the in-call signaling to be differentiated from other traffic. The terrestrial locations include mobile user terminals and gateways which provide connections to the land telephone line system. The spacecraft includes a transmitter and receiver, and an antenna which forms a plurality of spot beam footprints, in which the terrestrial terminals are located. Each of the terrestrial terminals transmits signals to, and receives signals from, the spacecraft. Each of the terrestrial terminals includes an encoder/decoder, for encoding at least call maintenance control signals, for temporarily interrupting the traffic signals to allow another action. The control signals may have bit content which exceeds the bit-carrying capability of the TDMA bursts, so transmission of the control signals must extended over a plurality of bursts.

2 Claims, 4 Drawing Sheets

CELLULAR SPACECRAFT TDMA COMMUNICATIONS SYSTEM WITH CALL INTERRUPT CODING SYSTEM FOR MAXIMIZING TRAFFIC THROUGHPUT

FIELD OF THE INVENTION

This invention relates to cellular communications systems, and more particularly to such systems which provide coverage of a region by way of a spacecraft.

BACKGROUND OF THE INVENTION

Mobile cellular communication systems have become of increasing importance, providing mobile users the security of being able to seek aid in case of trouble, allowing dispatching of delivery and other vehicles with little wasted time, and the like. Present cellular communication systems use terrestrial transmitters, such as fixed sites or towers, to define each cell of the system, so that the extent of a particular cellular communication system is limited by the region over which the towers are distributed. Many parts of the world are relatively inaccessible, or, as in the case of the ocean, do not lend themselves to location of a plurality of dispersed cellular sites. In these regions of the world, spacecraft-based communication systems may be preferable to terrestrial-based systems. It is desirable that a spacecraft cellular communications system adhere, insofar as possible, to the standards which are common to terrestrial systems, and in particular to such systems as the GLOBAL SYSTEM FOR MOBILE COMMUNICATIONS system (GSM), which is in use in Europe.

The GSM system is a cellular communications system which communicates with user terminals by means of electromagnetic transmissions from, and receptions of such electromagnetic signals at, fixed sites or towers spaced across the countryside. The GSM system is described in detail in the text *The GSM System for Mobile Communications*, subtitled *A Comprehensive Overview of the European Digital Cellular System*, authored by Michel Mouly and Marie-Bernadette Pautet, and published in 1992 by the authors, at 4, rue Elisée Reclus, F-91120 Palaiseaus France. Each fixed site or tower (tower) of the GSM system includes transmitter and receiver arrangements, and communicates with user terminals by way of signals having a bandwidth of 50 MHz., centered at about 900 Mhz., and also by way of signals having a bandwidth of 150 Mhz. Centered at about 1800 Mhz.

In cellular communications systems such as GSM, associated and dedicated control signaling is required for sending information messages about the system between the terrestrial mobile user terminal and the base station. "Associated" control signals are those which are associated with a particular traffic message, while "dedicated" control signals are not associated with any particular message. Such information messages serve two purposes: (1) call "Set-Up", for which standalone dedicated control channels, such as the SDCCH channel in the GSM system, are used during the initiation or setup of the call, and (2) Call Maintenance, for which slow and fast associated channels, such as SACCH and FACCH in the GSM system, are used to provide control signaling during the call, such as changing transmitted power, handing off to another cell, and the like. Mobile Satellite Systems based upon the GSM architecture use similar dedicated and associated control channels to send system information messages as part of call set-up and "in-call signaling."

Improved traffic throughput and error correction capability are desired for spacecraft cellular communications systems.

SUMMARY OF THE INVENTION

"In-Call Signaling" in a satellite system are equivalent to the Call Maintenance signals in GSM, and therefore must occur during a call, or while a call is currently in placer much as in FACCH. The "in-call" signalling is accomplished by "stealing" or commandeering portions of TDMA traffic slots from the ongoing call. The TDMA burst structure for GSM uses two bits designated with information-carrying capacity to indicate when traffic data is being overridden by in-call signaling. The use of these two bits as an in-call-signalling flag reduces the available traffic throughput, and reduces the available error-correction capability for traffic. In general, improved traffic throughput and error correction capability are provided by in-call signalling without the need for flag bits, while still allowing the in-call signaling to be differentiated from other traffic. More particularly, a spacecraft time-division multiple-access (TDMA) cellular communications system provides for communication of traffic signals, which may include audio information or data, between terminals at disparate terrestrial locations. As is known to those skilled in the art, TDMA communication is by way of bursts or short periods of signal transmission, which are temporally interleaved with corresponding bursts from other terminals. The terrestrial locations may be mobile user terminals or gateways, which provide connections to the land telephone line system, or other corresponding systems. The communications system includes a transmitting and receiving arrangement at the spacecraft, and an antenna arrangement coupled to the transmitting and receiving arrangement, for forming a plurality of spot beams, each of which defines a footprint on the terrestrial surface. The footprints of the spot beams may partially overlap, to provide continuous coverage of an area by multiple spot beams. The communications system includes a plurality of terrestrial terminals. Some of the terrestrial terminals may be located in the footprints generated by the spot beams. Each of the terrestrial terminals transmits electromagnetic signals to the spacecraft within a predetermined frequency band, and receives electromagnetic signals from the spacecraft within a second frequency band. The first and second frequency bands are different, and in one embodiment of the invention the second frequency band is lower in frequency than the first. Each of the terrestrial terminals further includes an encoder/decoder, for encoding at least call maintenance control signals to generate encoded control signals. The call maintenance signals are for at least temporarily interrupting the traffic signals being received at a remote location, for allowing another action to be performed. The terrestrial terminals also transmit the encoded control signals to another one(s) of the terrestrial terminals by way of the electromagnetic signals, and decode received encoded control signals. The control signals may have bit content which exceeds the bit-carrying capability of the bursts of the TDMA communications, whereby transmission of the control signals must extend over a plurality of the bursts. The encoder/decoder first adds at least error detection codes, and in one embodiment error detection and correction codes, to the control signals, to form error-adjusted control signals. Next, the encoder/decoder further encodes the error-adjusted control signals, by dividing the encoded error-adjusted control signals into a plurality of equal-content portions, and encoding each of the equal-content portions for transmission on a single burst rather than on a set of multiple bursts. The TDMA communications system also includes a network control system coupled to the terrestrial terminals, for controlling the timing of TDMA burst signals transmitted between the terrestrial stations by way of the spacecraft, so as to properly interleave the signals to prevent mutual interference. Each of the terrestrial terminals includes an inserter for inserting the call maintenance signals into a burst only when a call is to be interrupted. As a result, bits are allocated to the call maintenance signals only when a call is to be interrupted, and not otherwise. This arrangement avoids the need for interrupt flag signals in each burst, which thereby makes more bits available for traffic signals, which in turn increases the traffic throughput, and the interrupt of current or present-time traffic by the call maintenance signal can be received on each individual burst rather than having to wait for completion of reception of a group of related bursts.

BRIEF DESCRIPTION OF THE DRAWING

FIG. 2b is a simplified flow chart illustrating the operation of the arrangement of FIG. 2a.

DESCRIPTION OF THE INVENTION

Figure 1:
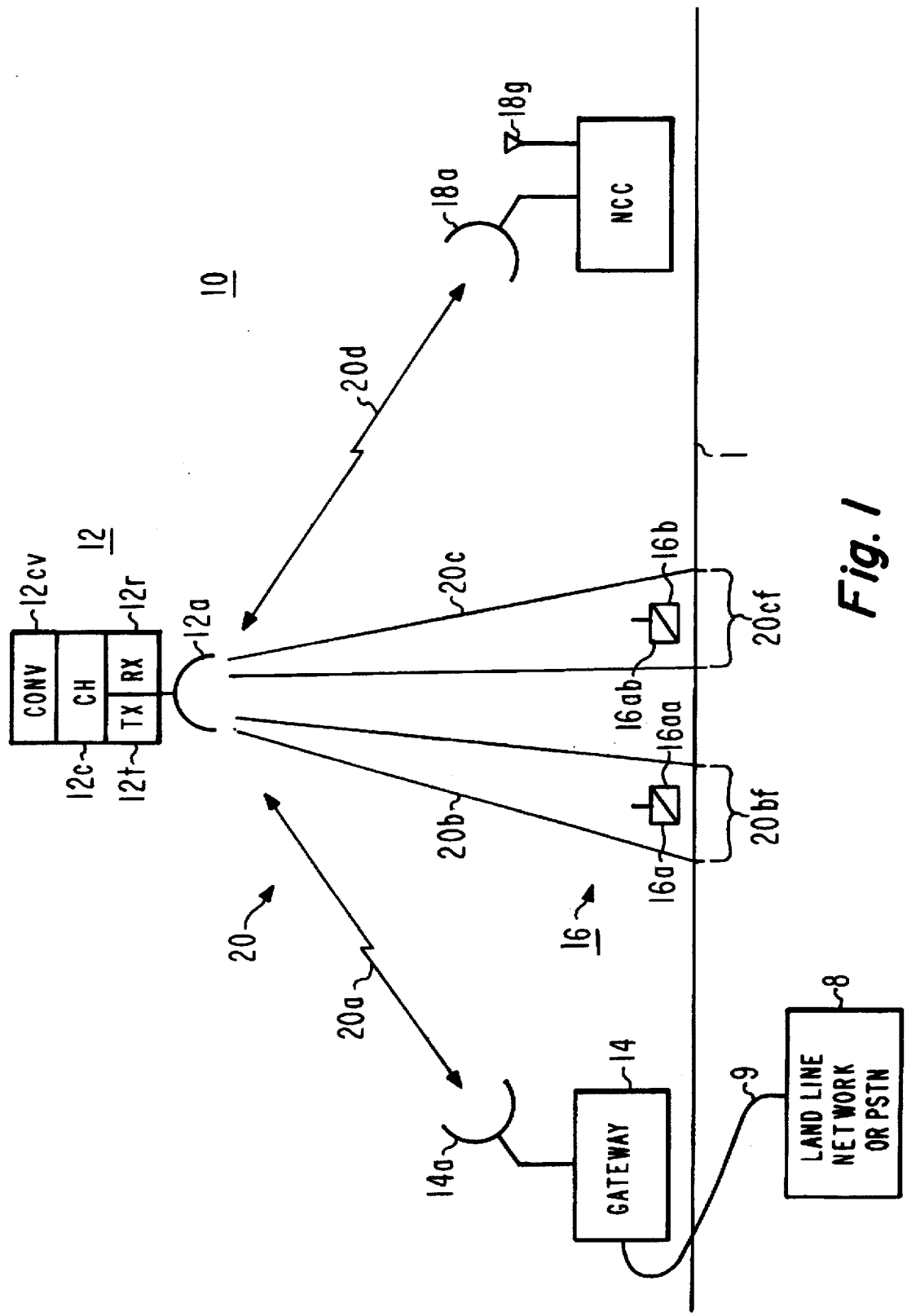
FIG. 1 is a simplified representation of a plurality of ground terminals, including a gateway terminal, communicating with each other by way of a spacecraft repeater.

FIG. 1 is a simplified block diagram of a spacecraft or satellite cellular communications system 10. In system 10, a spacecraft 12 includes a transmitter (TX)12t, a receiver (RX) 12r, and a frequency-dependent channelizer 12c, which routes bands of frequencies from the receiver 12r to the transmitter 12t. Spacecraft 12 also includes an array of frequency converters 12cv, which convert the uplink frequency to an appropriate downlink frequency. Antenna 12a generates a plurality 20 of spot beams, one spot beam for each frequency band some of the spot beams are illustrated as 20a, 20b, 20c, and 20d. Each spot beam 20x (where x represents any suffix) defines a footprint on the earth 1 below. Two of the spot beams are illustrated as 20bf and 20cf. It will be understood that those spot beams which are illustrated in "lightning bolt" form also produce footprints. As is known to those skilled in the art, the footprints of spot beams from a spacecraft may overlap, to provide continuous coverage of the terrestrial region covered by the spot beams.

As illustrated in FIG. 1, a group 16 of mobile terrestrial user terminals or stations includes two mobile user terminals, denominated 16a and 16b, each of which is illustrated as having an upstanding whip antenna. User terminal 16a lies within the footprint 20bf, and user terminal 16b lies within footprint 20cf. User terminals 16a and 16b provide communications service to users, as described below. Each user terminal 16a and 16b is illustrated as including an access signal generator 16aa and 16ab, respectively. FIG. 1 also illustrates a terrestrial gateway terminal 14 (fixed site, tower, or station) 24, which lies in a footprint (not designated) of spot beam 20a. Gateway terminal 14 communicates with spacecraft 12 by way of electromagnetic signals transmitted from an antenna 14a, and receives signals from the spacecraft by way of the same antenna. Gateway terminal 14 provides communication between spacecraft cellular communications system 10 and a landline network illustrated as a block 8. While a single gateway 14 is illustrated, the system 10 may contain many gateways at spaced-apart locations.

A network control center (NCC) 18 in FIG. 1 is a terrestrial terminal which includes an antenna 18a for communication with the spacecraft, and by way of the spacecraft to the mobile user terminals 16 and the gateway(s) 14. NCC 18 also includes a GPS receiving antenna 18g for receiving global positioning time signals, to provide an accurate time clock. The network control center performs the synchronization and TDMA control which the spacecraft cellular communications network requires. There may be a plurality of such NCCs throughout the system, adapted for providing control for particular sets of channels of the system. While NCC 18 is illustrated as being separate from gateway those skilled in the art will recognize that the NCC includes functions, such as the antenna, which are duplicated in the gateway 14, and it makes economic sense to place the NCC(s) at the sites of the gateway(s), so as to reduce the overall system cost by taking advantage of the redundancies to eliminate expensive subsystems.

It should be understood that the normal operation of a TDMA transmitter inherently performs an interleaving function, in that a plurality of messages constituting different information are transmitted over a plurality of different "channels", each of which is represented by a non-continuous sequence of bursts, interleaved with other sequences of bursts, which carry the other information. Thus, the data of the various messages is broken into packets which are temporally interleaved onto the channel to form "virtual" channels. The function of block 234 of FIG. 2b substitutes the interrupt message in one virtual channel for the current message data which would otherwise flow in that virtual channel. In effect, the interleaved messages are then further interleaved by the TDMA system.

Figure 2A:
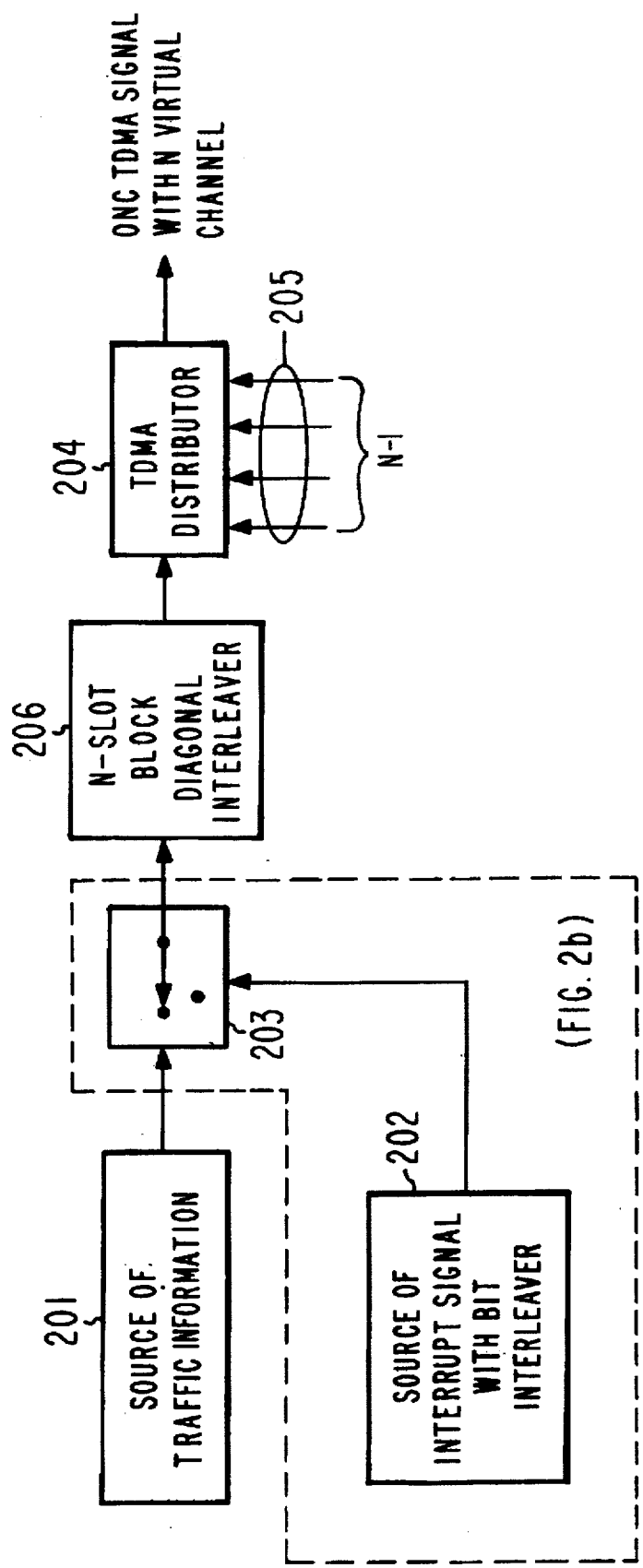
FIG. 2a is a simplified block diagram of a portion of the structure at a gateway terminal of the cellular communications system of FIG. 1.

FIG. 2a is a simplified block diagram of a portion of the structure at a gateway terminal of the cellular communications system of FIG. 1. In FIG. 2a, a source of message signals is illustrated as a block 201. These message signals may include voice or data to be transmitted to a particular one of the mobile user terminals. The message signals are transmitted by way of a block 203 to a TDMA distributor illustrated as a block 204. Block 204 also receives messages on other channels, illustrated as 205, which messages are to be transmitted to other ones of the mobile user terminals. TDMA distributor 204 interleaves the slots of the various messages in accordance with a TDMA protocol, in known fashion, to produce one channel of data, which is transmitted, together with other such channels, to the spacecraft, for retransmission in a "bent-pipe" manner. The spacecraft then distributes the various channels to individual ones of the spot beams, depending upon the carrier frequency of the channel in question. The particular channel originating from traffic source 201 of FIG. 2a is modulated onto a selected carrier frequency, and is ultimately distributed by way of a single spot beam to all mobile user terminals lying within the footprint of that particular spot beam.

In FIG. 2a, a source of encoded call maintenance control signals is illustrated as a block 202. The encoding of the call maintenance signals is described in conjunction with FIG. 2b, below. The encoded call maintenance signals constitute, in general, a set of four slots' worth of data which is substituted for an equivalent amount of traffic data in an interleaver 203. Interleaver 203 is effectively a "single-pole, double-throw switch", which connects either traffic information source 201 or call maintenance signal source 202 to traffic N-slot block diagonal interleaver 206 and to TDMA distributor 204. During that time in which interleaver 203 connects call maintenance signal source 202 to distributor 204, the traffic signals from traffic information source 201 are not transmitted, and are lost. Traffic N-slot block diagonal interleaver 206 receives what is essentially a continuous stream of data which originates either from traffic information source 201 or call maintenance signal source 202, and interleaves bits among multiple slots, as described in more detail in the text *Mobile Radio Communications*, by Raymond Steele, published 1992 by Pentech Press, London, ISBN 0-7273-1406-8, which describes the block interleaver and the diagonal interleavers separately, the slot diagonal block interleaver referred to above is merely the concatenation of block and diagonal interleavers. The Steele book also contains a description of the GSM cellular system.

Figure 2B:
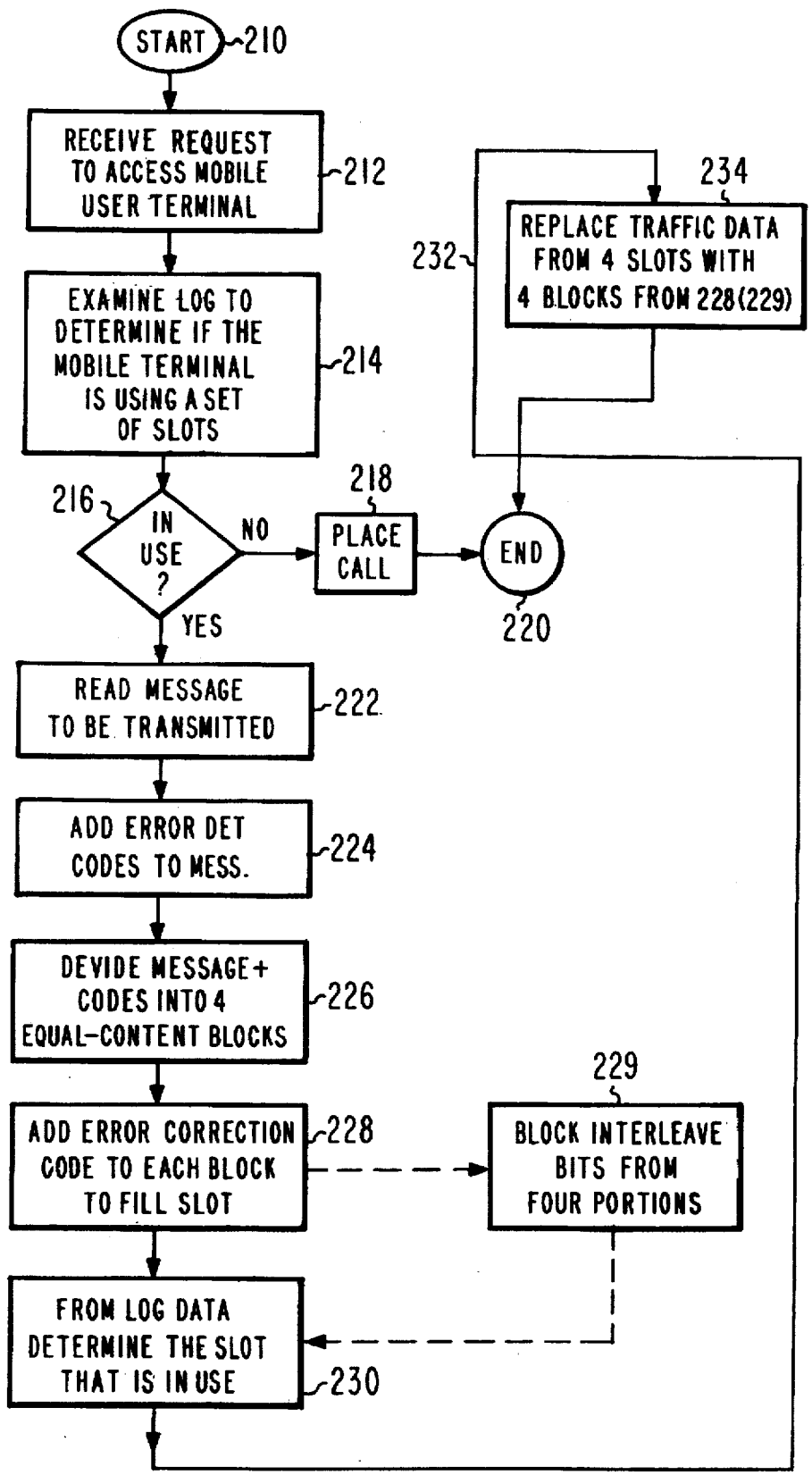

FIG. 2b is a simplified flow chart illustrating the logic for performing encoding of the call maintenance signal at either the mobile user terminal or the gateway. For definiteness, the generation at the gateway is illustrated. In FIG. 2b, the logic starts at a START block 210, and flows to a further block 212, which represents reception of a request for access to a mobile user terminal associated with the gateway in question. This request may result from a phone call from the land-line network or Public Switched Telephone System (PSTN), or from the need of a network in the form of either the gateway or the NCC to communicate with the mobile terrestrial user terminal on resource management issues, such as call maintenance signal on fast-associated control signal. Having received the request for access, the logic flows from block 212 to a further block 214, which represents examination of a log at the gateway which associates a particular time slot pattern with a particular mobile user terminal currently being served. The mobile user terminal for which access has been requested will either be in use, or will be idle. The logic flows to a decision block 216, which routes the logic flow, depending upon whether the mobile user terminal to be accessed is in use or not. If the mobile user terminal is not in current use, the logic leaves decision block 216, and flows to a block 218, which represents the encoding of the message onto a time slot directed to that mobile terminal, and the message is transmitted immediately. The logic then flows to a STOP block 220.

On the other hand, if the mobile user terminal is currently in use, the logic leaves decision block 216 of FIG. 2b by the YES output, and flows to a further block 222. Block 222 represents the reading of the message to be transmitted to the selected mobile user terminal which is to be accessed. Block 224 represents the "addition" to the message of at least error detection codes, and preferably error detection and correction codes. The message is so encoded as to guarantee reception of the signals over a channel which is relatively weak. Unfortunately, the length of the message with error detection or EDAC codes is longer than the slot interval. Consequently, the logic flows to a block 226, which represents the division of the message into four equal-content portions, each of which is smaller than a slot or burst, meaning that the data content of each of the four portions can be fitted into a single slot interval. It should be understood that the number four is appropriate for a particular embodiment of the invention, and may differ for other slot intervals or message lengths, or for error coding of different robustness. Block 228 represents "addition" of error correction codes to each of the four equal-content portions of the message. Thus, the complete message is encoded a first time with at least error detection codes, and after division into four (or any number) of portions, the individual equal-content portions of the message are each again encoded, this time with error correction codes. Error correction codes are added to each equal-content portion of the original coded message, in an amount sufficient to fill a slot interval or slot data-carrying ability. In one mode of operation of the flow chart of FIG. 2b, the logic flows to a further block 229, which represents the interleaving of the bits of each of the equal-content error-coded portions of the message, to distribute errors throughout the slot, and also to aid in identifying a call maintenance message, as described below. Whether the bits are interleaved or not, the logic flows from block 228 to a further block 230, which represents the extraction from the log previously used of the slot set in which the mobile user terminal is using. Finally, the logic flows by way of a logic path 232 to a further block 234, which represents substitution of the four equal-content error-coded messages into the next four slots of traffic data allocated to the mobile user terminal in question, as described above in relation to FIG. 2a. The logic then ends at block 220.

Figure 3:
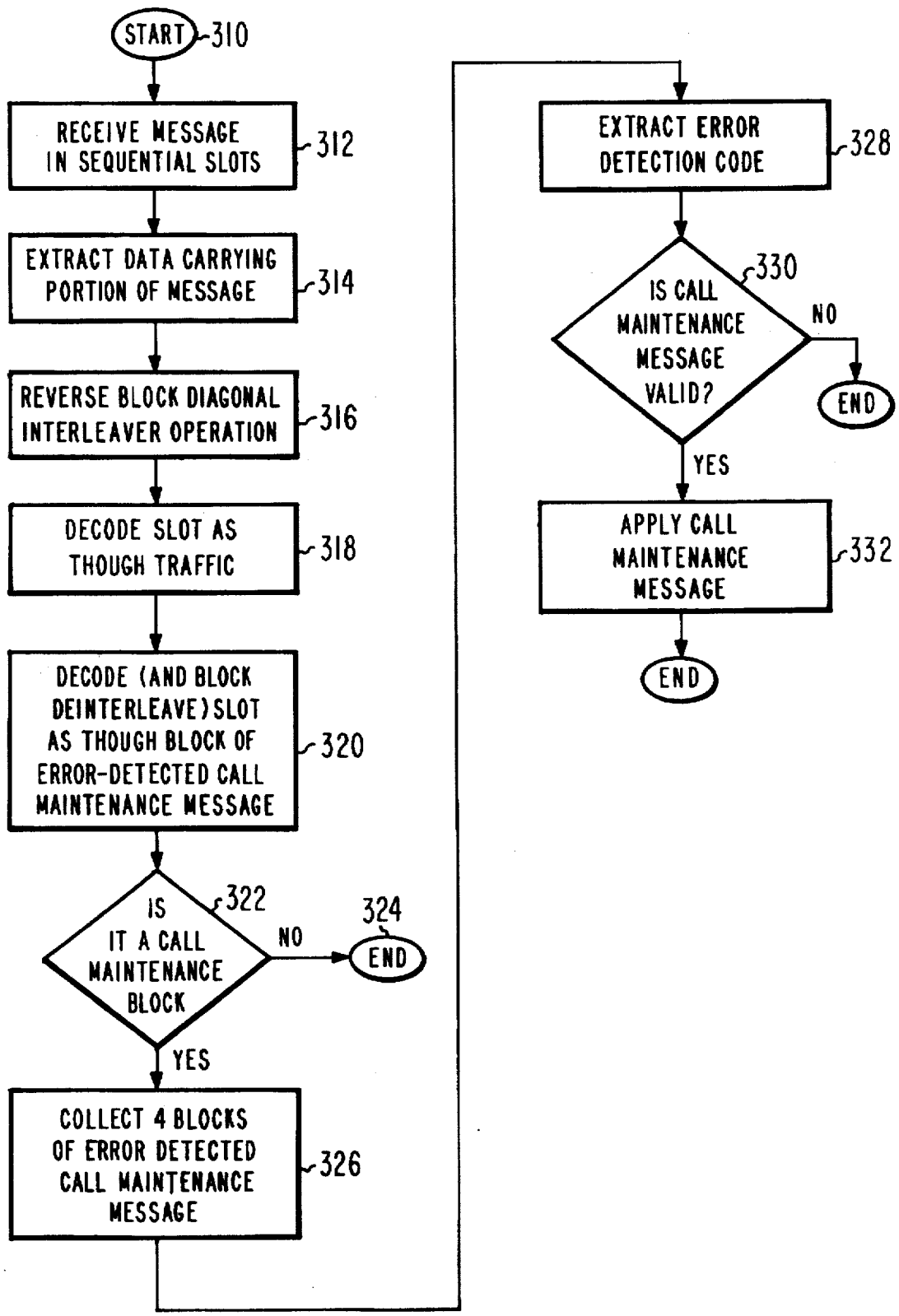
FIG. 3 is a simplified flow chart which represents the logic flow in a mobile user terminal which receives a call maintenance signal during normal operation.

FIG. 3 represents the logic flow in a mobile user terminal which receives a call maintenance signal during normal operation. In general, the reception of the TDMA encoded call maintenance signal requires reversing the encoding of the original signals, and it is assumed that the TDMA decoding has already been accomplished, in known fashion. In FIG. 3, the logic at the mobile user terminal begins at a START block 310, and flows to a further block 312. Block 312 represents reception of a message in a single current or present time slot, which results, in principle, in concatenation of the currently received data (the data from the current slot associated with this mobile user terminal) with the data from previous slots, to form a continuous message, which may include portions of the original traffic signals and a portion which represents the call maintenance signal, followed by further portions of traffic. From block 312, the logic flows to a block 314, which represents extraction of the data-carrying portions, at least by eliminating guard-bands, to leave bit-interleaved error-corrected signals. From block 314, the logic flows to a block 316, which represents reversal of the block diagonal interleaving originally introduced by block 206 of FIG. 2a. Such decoding is well known, and details are omitted.

From block 316 of FIG. 3, the logic flows to a block 318, which represents decoding of the concatenated message as though it were purely traffic, to produce what may be decoded traffic messages. The traffic message decoding is performed in accordance with whatever coding was used in coding the traffic message in block 201 of FIG. 2a. In practice, Viterbi decoding would ordinarily be used for decoding a convolutional code. The next block, namely logic block 320, represents the decoding of the concatenated signals as though they were purely call maintenance signals. For this purpose, the decoding follows, in a retrograde direction, the coding steps performed in blocks 228 and 229 (if used) of FIG. 2b. The corresponding decoding steps include block deinterleaving the bits to reverse the function of block 229, if appropriate, and also include the step of Viterbi decoding to regenerate the original call maintenance message, even in the presence of noise, using the convolutional error correction coding. From block 320, the logic flows to a decision block 322, in which the Viterbi decoded outputs (both traffic-decoded and call-maintenance decoded) are examined for symmetries in the decoding which indicate the presence of a valid call maintenance message. The presence of these symmetries in the decoding of a block or slot means that the slot contains call maintenance signal, and by inference indicates that the slot does not contain traffic message information. The logic leaves decision block 322 of FIG. 3 by the NO path when call maintenance signals are not present in a slot, and proceeds to a STOP block 324. The traffic message decoder signal is then presumed to be valid, and proceeds to its destination. On the other hand, if a call maintenance signal is present in a slot, the logic leaves decision block 322 by the YES output, and proceeds to a block 326, representing collection of four successive slot's worth of data into a concatenated message, corresponding to the condition of the call maintenance signal at the output of 226 of FIG. 2b. From block 326 of FIG. 3, the logic flows to a further logic block 328, representing extraction of the error detection codes which were added in block 224 of FIG. 2b. A decision block 330 of FIG. 3 represents evaluation of the remaining message to determine if it is valid, as for example by examining the error codes.

The call maintenance signal is then used for the desired function, which may be to authenticate a mobile user terminal, to command a handover, or to facilitate signalling between the mobile user terminal and the gateway during a call. Immediately after the call maintenance signals are received, the previous traffic message reception continues.

As so far described, the processing of the call maintenance signals insert such call maintenance signals into a flow of traffic signals flowing to the mobile user terminal. It might occur that the mobile user terminal would be in a transmission mode during the transmission of the call maintenance signal by the gateway terminal. In this event, the process of transmission and reception proceeds as described above, but when there is no traffic information within the slot allocation to be interrupted, and the call maintenance signals are interleaved into "empty" slots.

As so far described, the call maintenance signals have proceeded from the gateway to the mobile user terminal. For facilitation of in-call signalling, call maintenance signals may also flow from the mobile user terminals to the gateway. The encoding and decoding operations are performed in much the same manner. The only difference is that in the case of the mobile user terminal, the function performed by the TDMA interleaver 204 of FIG. 2a is instead the function of interleaving the mobile user terminal's own messages into the channel's slots.

Thus, a spacecraft (12) time-division multiple-access (TDMA) cellular communications system (10) provides for communication of traffic signals, which may include audio information or data, between terminals (14, 16, 18) at disparate terrestrial locations. As is known to those skilled in the art, TDMA communication is by way of bursts or short periods of signal transmission, which are temporally interleaved with corresponding bursts from other terminals. The terrestrial locations may be user terminals (16) or gateways (14), which provide connections to the land telephone line system, or other corresponding system. The communications system includes a transmitting (12t) and receiving (12r) arrangement at the spacecraft (12), and an antenna arrangement (12a) coupled to the transmitting and receiving arrangement, for forming a plurality of spot beams (20), each of which defines a footprint (20xf) on the terrestrial surface (1). The footprints (20xf) of the spot beams may partially overlap, to provide continuous coverage of an area by multiple spot beams. The communications system (10) includes a plurality of terrestrial terminals. Some of the terrestrial terminals (14, 16, 18) may be located in the footprints (20xf) generated by the spot beams (20). Each of the terrestrial terminals (14, 16, 18) transmits electromagnetic signals to the spacecraft (12) within a predetermined frequency band, and receives electromagnetic signals from the spacecraft (12) within a second frequency band. The first and second frequency bands may be different, and in one embodiment of the invention the second frequency band is lower in frequency than the first. Each of the terrestrial terminals (14, 16, 18) may further include an encoder/decoder (201, 202, 203, 206, 224, 226, 228, 229, 316, 318, 320, 326, 328) for encoding at least call maintenance control signals to generate encoded control signals. The call maintenance signals are for at least temporarily interrupting the traffic signals being received at a remote location, for allowing another action to be performed. The terrestrial terminals (14, 16, 18) also transmit the encoded control signals to another one(s) of the terrestrial terminals by way of the electromagnetic signals of the spacecraft, and decode received encoded control signals. The control signals may have bit content which exceeds the bit-carrying capability of the bursts of the TDMA communications, whereby transmission of the control signals must extend over a plurality of the bursts. The encoder/decoder first adds at least error detection codes (224), and in one embodiment error detection and correction codes, to the control signals, to form error-adjusted control signals. Second, the encoder/decoder further encodes the error-adjusted control signals, by dividing the encoded error-adjusted control signals into a plurality of equal-content portions (226), and encoding each of the equal-content portions for transmission on a single burst rather than on a set of multiple bursts (228). The TDMA communications system also includes a network control system (18) coupled (by way of the spacecraft) to the terrestrial terminals, for controlling the timing of TDMA burst signals transmitted between the terrestrial terminals by way of the spacecraft, so as to tend to properly interleave the signals to prevent mutual interference. Each of the terrestrial terminals includes an inserter (203) for inserting the call maintenance signals into a burst only when a call is to be interrupted. As a result, bits are allocated to the call maintenance signals only when a call is to be interrupted, and not otherwise. This arrangement avoids the need for interrupt flag signals in each burst, which thereby makes more bits available for traffic signals, which in turn increases the traffic throughput, and the interrupt of current or present time traffic by the call maintenance signal can be received on each individual burst rather than having to wait for completion of reception of a group of related bursts.

Other embodiments of the invention will be apparent to those skilled in the art. For example, while the uplink is described as being at a higher frequency than the downlink, the frequencies may be the same if the modulation or polarization provides for mutual separation, or the uplink may be at a lower frequency than the downlink.

What is claimed is:

1. A spacecraft TDMA cellular communications system, for communicating traffic signals between disparate terrestrial locations, said system comprising:

a spacecraft including transmitting and receiving means, and an antenna arrangement coupled to said transmitting and receiving means, for forming a plurality of spot beams, each of which defines a footprint, which footprints of said spot beams may partially overlap;

a plurality of terrestrial terminals, some of which may be mobile user terminals, at least some of said terrestrial terminals being located in said footprints, each of said terrestrial terminals being for transmitting electromagnetic signals to said spacecraft within a predetermined first frequency band, and for receiving electromagnetic signals within a second frequency band, different from said first frequency band, each of said terrestrial terminals further including encoding/decoding means, for encoding control signals to generate encoded control signals including at least call maintenance control signals, which call maintenance signals are for interrupting said traffic signals, said terrestrial terminals also transmitting said encoded control signals to another one of said terrestrial terminals by way of said electromagnetic signals, and for decoding received encoded control signals, wherein said control signals may have bit content which exceeds the bit carrying capability of the TDMA bursts of said communications system, whereby transmission of said control signals must extend over a plurality of said bursts, said encoding/decoding means encoding said control signals by dividing said control signals into a plurality of equal-content portions, and encoding each of said equal-content portions for transmission on a single burst rather than on a set of multiple bursts;

a network control system coupled to said terrestrial terminals, for controlling the timing of TDMA burst signals transmitted between said terrestrial stations by way of said spacecraft;

each of said terrestrial terminals including means for inserting said call maintenance signals into said burst only when a call is to be interrupted, whereby bits are allocated to said call maintenance signals only when a call is to be interrupted, and not otherwise, whereby no interrupt flag signals are used in a burst, which thereby makes more bits in each burst available for traffic, to thereby increase the traffic throughput, and whereby the interrupt of current traffic by said call maintenance signal can be received on each burst rather than on a group of bursts;

said encoding/decoding means of said terminals including means for (a) further encoding said equal-content-portions with error correction codes to form error-corrected portions, whereby the length of each error-corrected portion is no greater than the bit-carrying capacity of a single TDMA slot, so that each slot may be independently decoded, thereby reducing the amount of memory required in decoding said control signal, (b) at said decoder of said encoder/decoder, error correcting said error-corrected portions individually within each TDMA slot to produce decoded equal-content portions, (c) at said decoder of said encoder/decoder, examining symmetries in said decoded equal-content portions to determine the presence of said call maintenance control signals, and for (d) routing said decoded equal-content portions in accordance with one of the presence and absence of said call maintenance control signals.

2. A system according to claim 1, wherein said encoding/decoding means further comprises means for adding error detection codes to said call maintenance signal prior to division into said equal portions, to identify errors in the call maintenance message which are not corrected by said error correction codes.

\* \* \* \* \*